(12) United States Patent
Yoshida (10) Patent No.: US 7,066,552 B2
(45) Date of Patent: Jun. 27, 2006

(54) SEAT BACK FRAME FOR VEHICLE SEAT

(75) Inventor: Masami Yoshida, Tochigi (JP)

(73) Assignee: TS TECH Co., Ltd., Saitama (JP)

( * ) Notice: Subject to any disclaimer, the term of this patent is extended or adjusted under 35 U.S.C. 154(b) by 0 days.

(21) Appl. No.: 10/813,922

(22) Filed: Mar. 31, 2004

(65) Prior Publication Data

US 2004/0227389 A1     Nov. 18, 2004

(30) Foreign Application Priority Data

| Mar. 31, 2003 | (JP) | ............................. 2003-097397 |
| Mar. 31, 2003 | (JP) | ............................. 2003-097398 |
| Mar. 31, 2003 | (JP) | ............................. 2003-097399 |
| Mar. 31, 2003 | (JP) | ............................. 2003-097400 |

(51) Int. Cl.
*B60N 2/00* (2006.01)

(52) U.S. Cl. .................................................. 297/452.18

(58) Field of Classification Search ........... 297/452.18, 297/452.2

See application file for complete search history.

(56) References Cited

U.S. PATENT DOCUMENTS

| 4,505,515 | A | * | 3/1985  | Wilking et al. ............. 297/362 |
| 5,249,841 | A | * | 10/1993 | Chales ................... 297/452.18 |
| 5,516,134 | A | * | 5/1996  | Crawford et al. ......... 280/288.1 |
| 5,567,017 | A | * | 10/1996 | Bourgeois et al. ........ 297/452.2 |
| 5,626,396 | A | * | 5/1997  | Kuragano et al. ........ 297/452.2 |
| 5,671,976 | A | * | 9/1997  | Fredrick ................. 297/452.18 |
| 6,132,003 | A | * | 10/2000 | Sakurai et al. ......... 297/452.18 |
| 6,375,267 | B1 | * | 4/2002  | Ishikawa ............... 297/452.18 |
| 6,513,878 | B1 | * | 2/2003  | Nagayasu et al. ..... 297/452.18 |
| 6,761,412 | B1 | * | 7/2004  | Garnweidner et al. . 297/452.18 |
| 6,779,841 | B1 | * | 8/2004  | Eckendorff ............ 297/216.13 |

* cited by examiner

*Primary Examiner*—Milton Nelson, Jr.
(74) *Attorney, Agent, or Firm*—Dann, Dorfman, Herrell and Skillman, P.C.

(57) ABSTRACT

A seat back frame for a vehicle seat includes first and second side members spaced apart from each other, each of the first and second side members being made of ultra-high tensile strength steel, the first side member having a first longitudinal body of a substantially U-shape in cross-section, the first longitudinal body comprising a pair of first spaced apart flange sections and a first main plate section interconnecting the first spaced apart flange sections, the first side member having a first upper region and a first lower region, the second side member having a second longitudinal body of a substantially U-shape in cross-section, the second longitudinal body comprising a pair of second spaced apart flange sections and a second main plate section interconnecting the second spaced apart flange sections, the second side member having a second upper region and a second lower region, an upper member arranged between the first and second upper regions of the first and second side members, the upper member being made of ultra-high tensile strength steel, the upper member having first and second end portions, the upper member being mounted, by spot-welding, to the first and second upper regions of the first and second side members with the first and second end portions thereof being fitted in the first and second side members, and a lower member arranged between the first and second lower regions of the first and second side members, the lower member being made of ultra-high tensile strength steel, the lower member having third and fourth end portions, and the lower member being mounted, by spot-welding, to the first and second lower regions of the first and second side members with the third and fourth end portions thereof being fitted in the first and second side members.

44 Claims, 9 Drawing Sheets

SEAT BACK FRAME FOR VEHICLE SEAT

BACKGROUND OF THE INVENTION

1. Field of the Invention

This invention relates to a substantially quadrilateral-shaped seat back frame for a vehicle seat, which is assembled from components which are each made of a thin plate of ultra-high tensile strength steel and formed into a predetermined shape by press-machining the thin plate.

2. Description of the Prior Art

Generally, a seat back frame for a vehicle seat comprises a main pipe of a substantially inverted U-shape in outline, an upper plate member bridged between upper regions of both side portions of the inverted U-shaped pipe and mounted to the upper regions of the both side portions of the inverted U-shaped pipe by arc welding, side plate members mounted to the both side portions of the inverted U-shaped pipe by arc welding, and a lower pipe bridged between lower regions of the both side portions of the inverted U-shaped pipe and mounted to the lower regions of the both side portions of the inverted U-shaped pipe by arc welding. Each of the upper plate member and side plate members is formed into a predetermined shape by cutting a steel plate. The seat back frame is assembled from the components into a substantially quadrilateral-shape.

The conventional seat back frame is heavy in weight and weak in mechanical strength. As discussed above, the upper plate member, the side plate members, and the lower pipe member are mounted to the inverted U-shaped main pipe by arc welding. To carry out the welding while assuring a dimensional precision is troublesome.

SUMMARY OF THE INVENTION

The present invention has been made with a view to overcoming the foregoing problems of the prior art seat back frame.

It is therefore an object of the present invention to provide a seat back frame for a vehicle seat, which is light in weight and improved in mechanical strength and dimensional precision.

It is another object of the invention to provide a seat back frame for a vehicle seat, which can be easily assembled.

In accordance with the present invention, there is provided a seat back frame for a vehicle seat. The seat back frame comprises first and second side members spaced apart from each other, each of the first and second side members being made of ultra-high tensile strength steel, the first side member having a first longitudinal body of a substantially U-shape in cross-section, the first longitudinal body comprising a pair of first spaced apart flange sections and a first main plate section interconnecting the first spaced apart flange sections, the first side member having a first upper region and a first lower region, the second side member having a second longitudinal body of a substantially U-shape in cross-section, the second longitudinal body comprising a pair of second spaced apart flange sections and a second main plate section interconnecting the second spaced apart flange sections, the second side member having a second upper region and a second lower region, an upper member arranged between the first and second upper regions of the first and second side members, the upper member being made of ultra-high tensile strength steel, the upper member having first and second end portions, the upper member being mounted, by spot-welding, to the first and second upper regions of the first and second side members with the first and second end portions thereof being fitted in the first and second side members, and a lower member arranged between the first and second lower regions of the first and second side members, the lower member being made of ultra-high tensile strength steel, the lower member having third and fourth end portions, and the lower member being mounted, by spot-welding, to the first and second lower regions of the first and second side members with the third and fourth end portions thereof being fitted in the first and second side members.

The first side member may be provided at an upper area of the first main plate section thereof with a first reinforcing rib portion. The first reinforcing rib portion may be formed by embossing a region of the upper area of the first main plate section and making the region of the upper area of the first main plate section concave in such a manner that the region of the upper area of the first main plate section protrudes inward. The second side member may be provided at an upper area of the second main plate section thereof with a second reinforcing rib portion. The second reinforcing rib portion may be formed by embossing a region of the upper area of the second main plate section and making the region of the upper area of the second main plate section concave in such a manner that the region of the upper area of the second main plate section protrudes inward. The upper member may be provided at the first and second end portions thereof with first and second tongue-shaped pieces. The first and second tongue-shaped pieces are spot-welded to inward protruding surfaces of the first and second reinforcing rib portions. The inward protruding surfaces of the first and second reinforcing rib portions are made flat.

The first side member may be provided at a middle area of the first main plate section thereof with a third reinforcing rib portion and provided at a lower area of the first main plate section thereof with a fourth reinforcing rib portion. The second side member may be provided at a middle area of the second main plate section thereof with a fifth reinforcing rib portion and provided at a lower area of the second main plate section thereof with a sixth reinforcing rib portion.

The upper member may comprise an upper section and a base section. The upper section and the base section are combined with each other.

The lower member may comprise a longitudinal body, and bracket portions provided at both end portions of the longitudinal body of the lower member. The bracket portions are spot-welded to the lower regions of the first and second side members.

The seat back frame may further include a supplementary member for reinforcing the lower member. The supplementary member is spot-welded to the lower member. The supplementary member may comprise a longitudinal body and bracket portions provided at both end portions of the longitudinal body of the supplementary member. The bracket portions of the supplementary member are spot-welded to the bracket portions of the lower member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENTS

A seat back frame for a vehicle seat according to the present invention will be discussed hereinafter with reference to the accompanying drawings.

In an illustrated embodiment, the present invention is applied to a seat back frame for a vehicle seat including a height adjustable head rest, recliner devices for allowing a seat back of the vehicle seat to be pivotally moved relative to a seat cushion of the vehicle seat, and a slide rail mechanism for allowing the vehicle seat to be moved forward and rearward in a vehicle.

Figure 1:
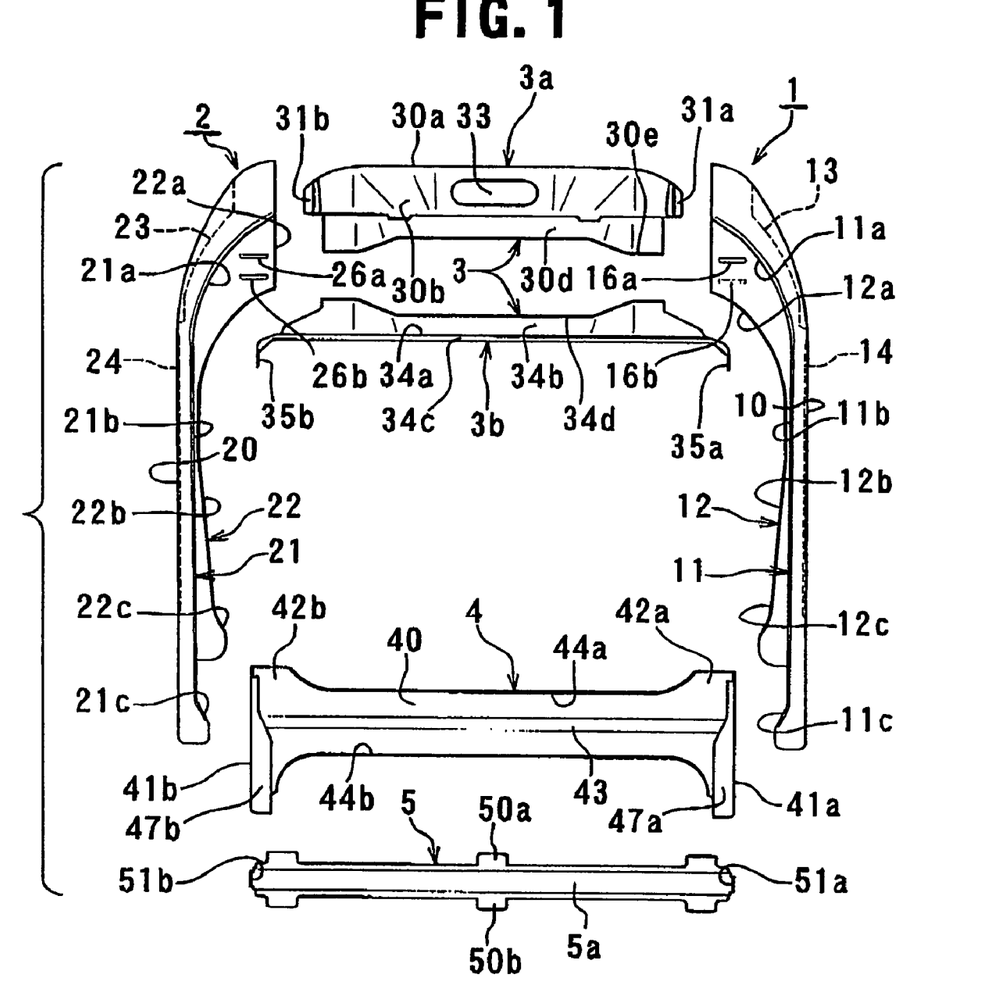
FIG. 1 is a schematic exploded front view of a seat back frame according to an embodiment of the present invention.
Figure 2:
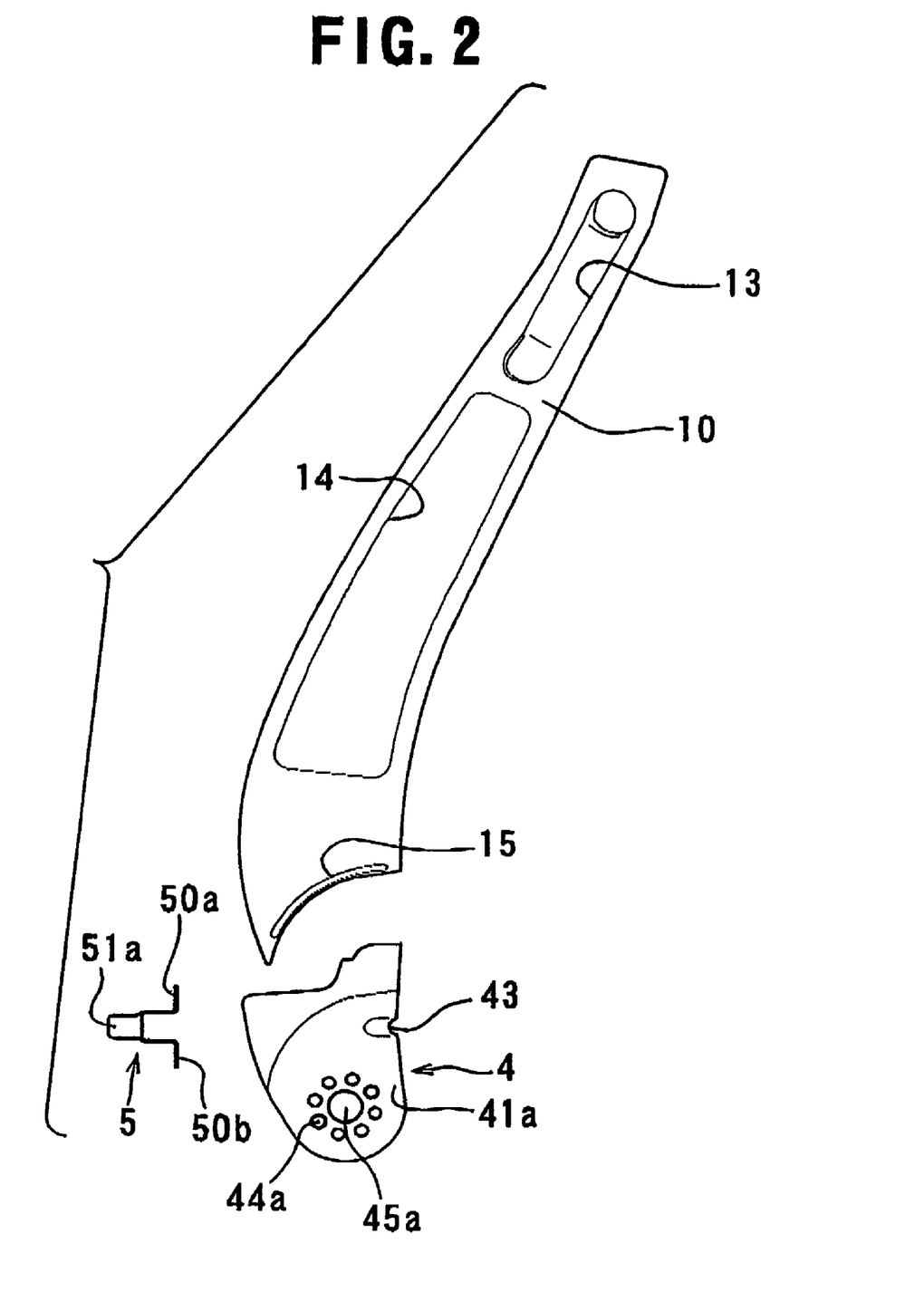
FIG. 2 is a schematic side view of the seat back frame shown in FIG. 1.

Referring to FIGS. 1 and 2, there is illustrated the seat back frame according to the embodiment of the present invention. The seat back frame comprises a pair of spaced apart side members 1, 2, an upper member 3 interconnecting upper portions of the side members 1,2, a lower member 4 interconnecting lower portions of the side members 1,2, and a supplementary member 5 for reinforcing the lower member 4. Each of the components of the seat back frame is made of ultra-high tensile strength steel, and is formed into a predetermined shape by press-machining a thin plate of ultra-high tensile strength steel. The upper member 3 and the lower member 4 are mounted to the spaced apart side members 1, 2 by spot-welding. Though tension springs are not shown in FIG. 1, the tension springs are to be stretched between the spaced apart side members 1,2.

Each of the side members 1, 2 has a longitudinal body of a substantially U-shape in cross-section. The longitudinal body of the first side member 1 comprises a pair of first and second flange sections 11, 12 which are spaced apart from each other in a direction perpendicular to a sheet of FIG. 1, and a main plate section 10 interconnecting the spaced apart flange sections 11, 12. The main plate section 10 has an outer surface which forms a portion corresponding to an area of a seat back which extends from one shoulder portion of the seat back to one side portion of the seat back. Similarly, the longitudinal body of the second side member 2 comprises a pair of third and fourth flange sections 21, 22 which are spaced apart from each other in the direction perpendicular to the sheet of FIG. 1, and a main plate section 20 interconnecting the spaced apart flange sections 21, 22. The main plate section 20 has an outer surface that forms a portion corresponding to an area of the seat back which extends from the other shoulder portion of the seat back to the other side portion of the seat back. An upper region of each of the side members 1, 2 is curved inward to form a portion corresponding to a corresponding shoulder portion of the seat back.

Each of the flange sections 11, 12, 21 22 has an upper region, a middle region, and a lower region. Upper regions 11a, 12a of the first and second flange sections 11, 12 lengthily extend inwardly as compared to middle regions 11b, 12b of the first and second flange portions 11, 12. Similarly, upper regions 21a, 22a of the third and fourth flange sections 21, 22 extend inwardly as compared to middle regions 21b, 22b of the third and fourth flange sections 21, 22. Further, the upper region 12a of the second flange section 12 lengthily extends inwardly as compared to the upper region 11a of the first flange section 11. A lower region 12c of the second flange section 12 lengthily extends inwardly as compared to a lower region 11c of the first flange section 11. Similarly, the upper region 22a of the fourth flange section 22 lengthily extends inwardly as compared to the upper region 21a of the third flange section 21. A lower region 22c of the fourth flange section 22 lengthily extends inwardly as compared to a lower region 21c of the third flange section 21.

The main plate section 10 of the first side member 1 has first reinforcing means for reinforcing the main plate section 10. The first reinforcing means includes a first vertically extending rib portion 13 of a substantially rectangular shape (see FIG. 2) provided at an upper region of the main plate section 10 and a second vertically extending rib portion 14 of a substantially rectangular shape (see FIG. 2) provided at a middle region of the main plate section 10. Similarly, the main plate section 20 of the second side member 2 has second reinforcing means for reinforcing the main plate section 20. The second reinforcing means includes a third vertically extending rib portion 23 of a substantially rectangular shape provided at an upper region of the main plate section 20 and a fourth vertically extending rib portion 24 of a substantially rectangular shape provided at a middle region of the main plate section 20. The first and second reinforcing means are formed by embossing portions of the main plate sections 10, 20 and making the portions of the main plate sections 10, 20 concave in such a manner that the portions of the main plate sections 10, 20 protrude inwardly. As will be discussed in greater detail hereinafter, both ends of the upper member 3 are to be welded to inwardly protruding surfaces of the first and third rib portions 13, 23 of the first and second side members 1, 2 by spot-welding. For this purpose, an inwardly protruding surface of each of the first and third rib portions 13, 23 is formed flat. In a case where a first arm rest is provided at the middle region of the main plate section 10 at which the second rib portion 14 is provided, and a second arm rest is provided at the middle region of the main plate section 20 at which the fourth rib portion 24 is provided, the second and fourth rib portions 14, 24 also serve as means to reinforce surfaces of the middle regions of the main plate sections 10, 20 on which the first and second arm rests are provided.

As shown in FIG. 2, a bead-like projection 15 for reinforcing a lower region of the main plate section 10 is provided on the lower region of the main plate section 10. Similarly, though not shown in FIG. 1, a bead-like projection for reinforcing a lower region of the main plate section 20 is provided on the lower region of the main plate section 20. Further, as shown in FIG. 1, bead-like projections 16a, 16b for reinforcing the lengthily extending upper region 12a of the flange section 12 are provided on the lengthily extending upper region 12a of the flange section 12, and bead-like projections 26a, 26b for reinforcing the lengthily extending upper region 22a of the flange section 22 are provided on the lengthily extending upper region 22a of the flange section 22a. In addition to serving as the reinforcing means, each of the bead-like projections 15, 16a, 16b, 26a, 26b and unshown bead-like projection of the lower region of the main plate section 20 serves as means to prevent a plate of ultra-high tensile strength steel from warping when the plate is press-machined in order to make each of the first and second side members 1, 2.

Figure 3:
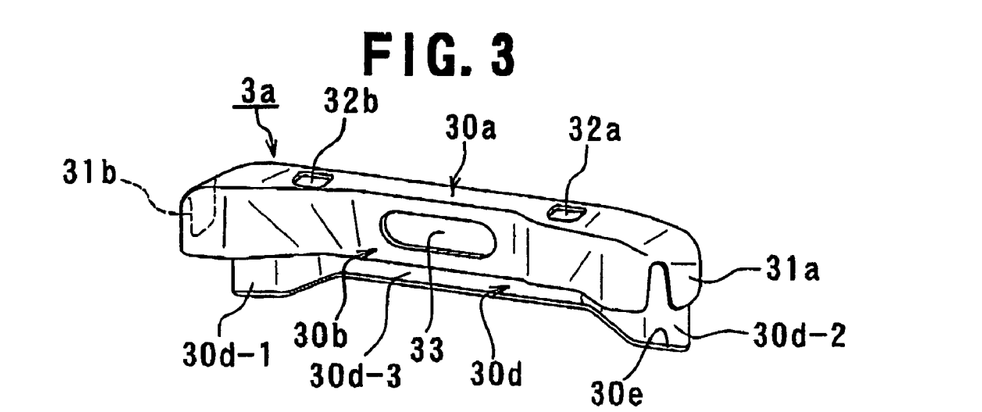
FIG. 3 is a schematic perspective view of an upper section of an upper member of the seat back frame.
Figure 4:
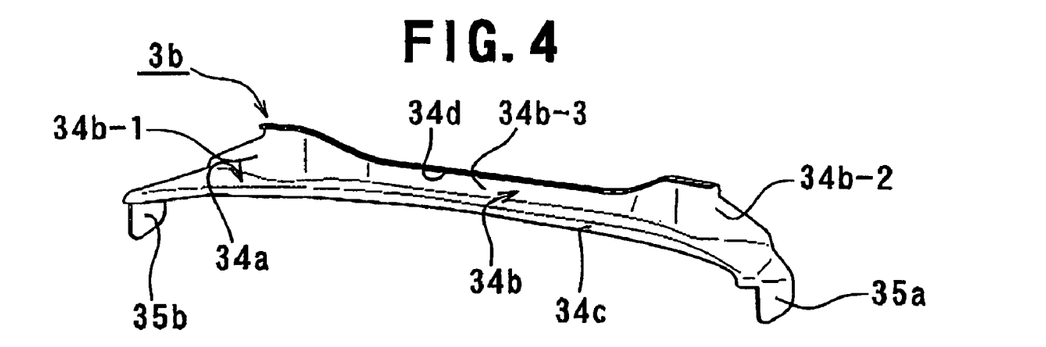
FIG. 4 is a schematic perspective view of a base section of the upper member.
Figure 5:
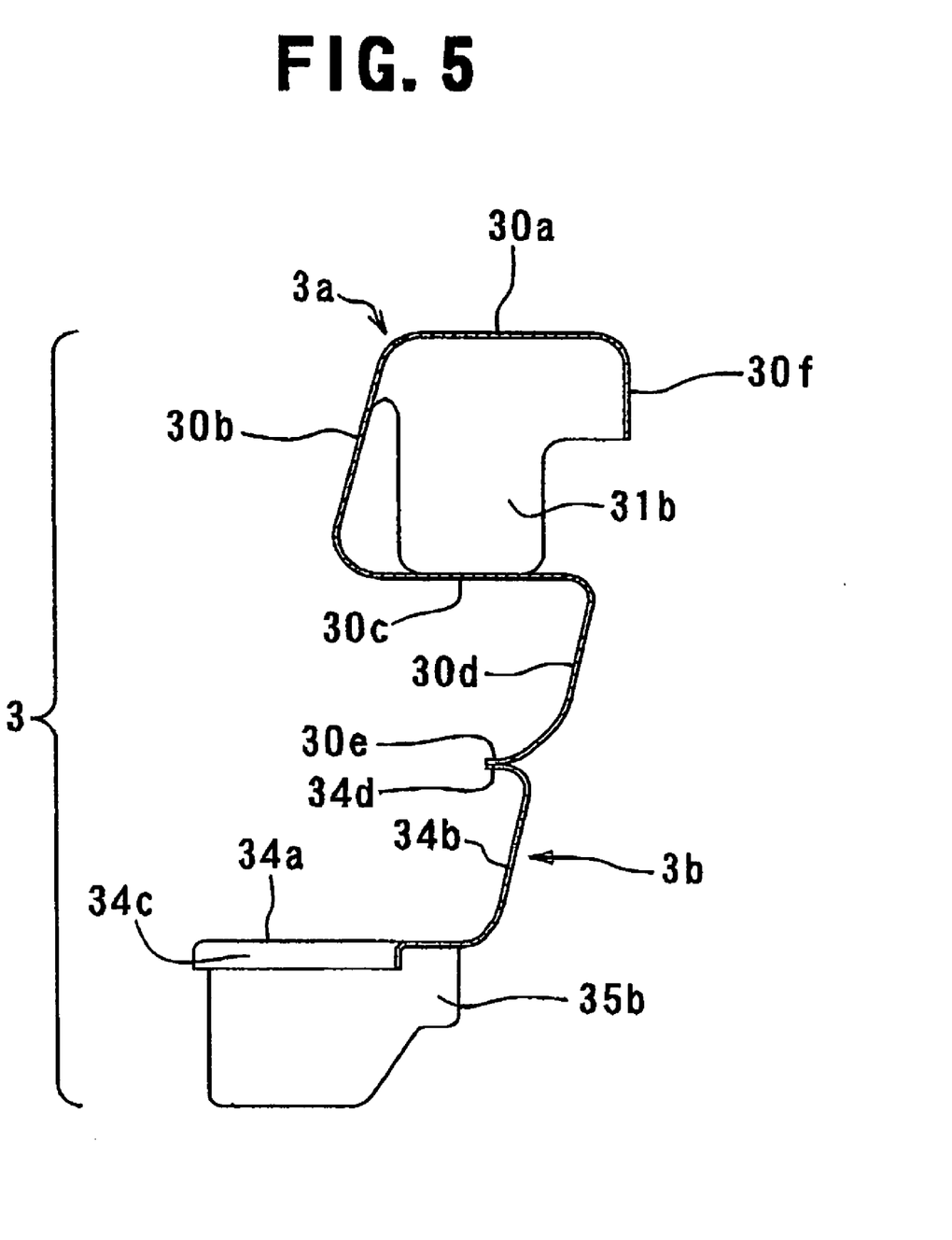
FIG. 5 is a schematic enlarged sectional side view of the upper member taken on a plane indicated in FIG. 10 by line V—V.

Referring to FIGS. 3 to 5, the upper member 3 comprises an upper section 3a that forms a portion corresponding to an upper portion of the seat back, and a base section 3b for receiving and supporting the upper section 3a.

As shown in FIGS. 3 and 5, the upper section 3a of the upper member 3 comprises a top horizontal surface portion 30a, a front side surface portion 30b continuously extending downward from the top surface portion 30a, a bottom surface portion 30c continuously extending from the front side surface portion 30b in substantially parallel with the top horizontal surface portion 30a, a downward extending surface portion 30d continuously extending and hanging from the bottom surface portion 30c, and a lower flange portion 30e extending along a lower edge of the downward extending surface portion 30d. In addition, a rear side surface portion 30f continuously extends downward from the top surface portion 30a. The top surface portion 30a is provided at both sides thereof with downward bent tongue-shaped pieces 31a, 31b which are to be welded to the side members 1, 2 by spot-welding. The tongue-shaped pieces 31a, 31b are formed by bending both end portions of the top surface portion 30a downward, and continuously extend from the top surface portion 30a and the rear side surface portion 30f at upper regions thereof.

The downward extending surface portion 30d of the upper section 3a has a first end region 30d-1, a second end region 30d-2, and a middle region 30d-3 between the first end region 30d-1 and the second end region 30d-2. The first and second end regions 30d-1, 30d-2 are projected forward from the middle region 30d-3. The flange portion 30e is protruded forward from the downward extending surface portion 30d. The top surface portion 30a is formed with a pair of spaced apart through-holes 32a, 32b. Similarly, a pair of spaced apart through-holes (not shown) are formed in the bottom surface portion 30c and aligned with the pair of the spaced apart through-holes 32a, 32b of the top surface portion 30a. Holders for head rest stays (not shown) are to be inserted in the through-holes 32a, 32b of the top surface portion 30a and the unshown through-holes of the bottom surface portion 30c. Further, in order to make the upper section 3a lighter in weight, an opening 33 is formed in the front surface portion 30b by punchin g a central portion of the front surface portion 30b.

As shown in FIGS. 4 and 5, the base section 3b of the upper member 3 comprises a base body 34a and a rising portion 34b rising upwardly from the base body 34a. A front side edge of the base body 34a is formed into a substantially bow-shape so as to protrude forward at both end portions of the base body 34a. A downward protruding flange 34c is provided along the bow-shaped edge of the base body 34a. The base body 34a is provided at both side regions thereof with downward bent tongue-shaped pieces 35a, 35b which are to be welded to the side members 1, 2 by spot-welding. The rising portion 34b of the base section 3b comprises a first end region 34b-1, a second end region 34b-2, and a middle region 34b-3 between the first end region 34b-1 and the second end region 34b-2. The first and second end regions 34b-1, 34b-2 are protruded forward from the middle region 34b-3. An upper flange 34d is provided along an upper edge of the rising portion 34b and protruded forward from the rising portion 34b.

In a state where the upper section 3a and the base section 3b are combined with each other as shown in FIG. 5, the lower flange 30e of the downward extending portion 30d and the upper flange 34d of the rising portion 34b are abutted against each other at the end portions 30d-1, 30d-2, 34b-1, 34b-2.

Figure 6:
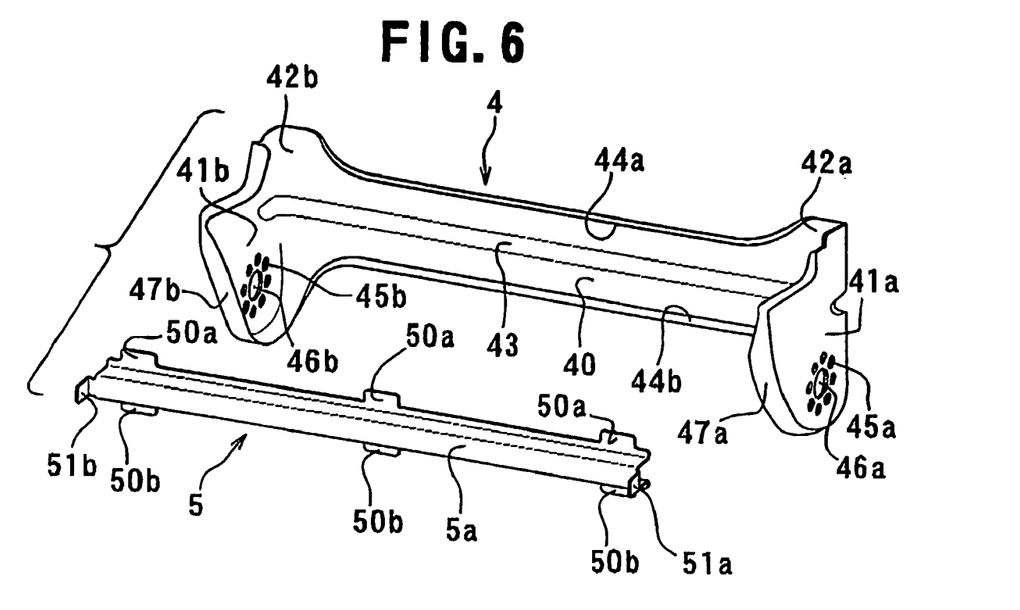
FIG. 6 is a schematic perspective view of a lower member and supplementary member of the seat back frame.

Referring to FIG. 6, the lower member 4 comprises a longitudinal body 40, a pair of bracket portions 41a, 41b provided at both ends of the longitudinal body 40, and upwardly extending pieces 42a, 42b continuously extending from the longitudinal body 40 and the bracket portions 41a, 41b. The bracket portions 41a, 41b and the upwardly extending pieces 42a, 42b are to be attached to the side members 1, 2 by spot-welding. The lower member is provided at the longitudinal body 40 thereof with a bead-like embossed portion 43, whereby the longitudinal body 40 is reinforced. The bead-like embossed portion 43 extends along the longitudinal body 40 and is protruded forward. Further, forward bent flange portions 44a, 44b extend along upper and lower edges of the longitudinal body 40.

Substantially disc-like recliner devices (not shown) are to be mounted on outer surfaces of the bracket portions 41a, 41b. The bracket portions 41a, 41b are formed with a plurality of fastening holes 45a, 45b for allowing the recliner devices to be mounted on the bracket portions 41a, 41b by bolts, and through-holes 46a, 46b through which a connecting shaft (not shown) for interconnecting the recliner devices is to be inserted. A lower region of each of the bracket portions 41a, 41b is formed into a circular arc-shape which matches with a shape of a corresponding disc-like recliner device. Each of the bracket portions 41a, 41b is provided along its peripheral edge with a flange 47a (or 47b).

The supplementary member 5 comprises a longitudinal body 5a having the shape of a substantially Ohm-symbol in cross-section. The longitudinal body 5a of the supplementary member 5 comprises a pair of spaced apart longitudinal portions, a connecting longitudinal portion interconnecting the spaced apart longitudinal portions, and protruding fin portions extending along edges of the spaced apart longitudinal portions and protruding from the spaced apart longitudinal portions. The supplementary member 5 is to be attached to the lower member 4 by spot-welding so as to cover the embossed portion 43 of the lower member 4. The supplementary member 5 has a width enough to cover the embossed portion 43 of the lower member 4. Spaced apart rising tongue-shaped pieces 50a and spaced apart rising tongue-shaped pieces 50b are provided at upper and lower edges of the fin portion of the spaced apart longitudinal portions of the supplementary member 5. The tongue-shaped pieces 50a, 50b are to be welded to the longitudinal body 40 of the lower member 4 by spot-welding. Further, the connecting longitudinal portion of the supplementary member 5 is provided at both ends thereof with forward bent tongue-shaped pieces 51a, 51b which are to be welded to the flange portions 41a, 41b of the lower member 4.

Referring to FIGS. 7 to 10, assembling of the seat back frame will be discussed hereinafter.

Figure 7:
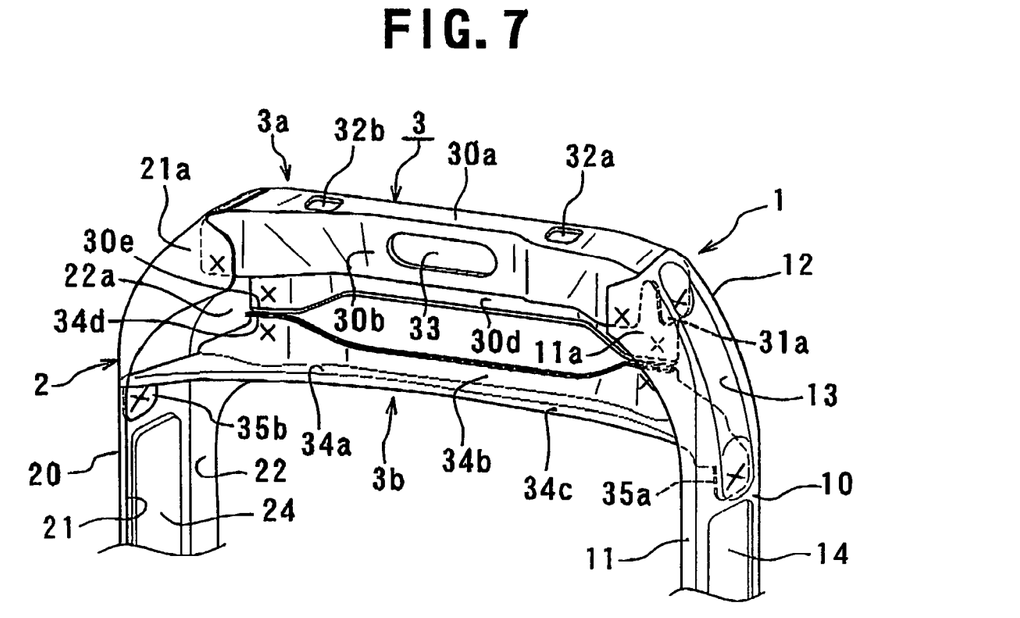
FIG. 7 is a schematic perspective view in which the upper member is combined with spaced apart side members of the seat back frame.

As shown in FIG. 7, the upper member 3 is combined with the side members 1, 2 with the both sides thereof being fitted in the U-shaped side members 1, 2 and with the tongue-shaped pieces 31a, 31b thereof being contacted with upper regions of the inward protruding surfaces of the rib portions 13, 23 of the side members 1, 2.

The upper section 3a of the upper member 3 is mounted to the side members 1, 2 by spot-welding the front side surface portion 30b of the upper section 3a to the first and third flange portions 11, 21 of the side members 1, 2, spot-welding the downward extending surface portion 30d and rear side surface portion 30f of the upper section 3a to the second and fourth flange portions 12, 22 of the side members 1, 2, and spot-welding the tongue-shaped pieces 31a, 31b of the upper section 3a to the upper regions of the inward protruding surfaces of the rib portions 13, 23. Incidentally, the welding points are denoted by a reference designator X in FIGS. 7 to 10.

The base section 3b of the upper member 3 is mounted to the side members 1, 2 by spot-welding both side regions of the rising portion 34b of the base section 3b to the second and fourth flange portions 12, 22 of the side members 1, 2, and spot-welding the tongue-shaped pieces 35a, 35b of the base section 3b to lower regions of the inward protruding surfaces of the rib portions 13, 23 of the side members 1, 2, whereby the upper section 3a is received and supported by the base section 3b. Incidentally, the mounting of the upper section 3a to the side members 1, 2 is preferably carried out after the base section 3b is mounted to the side members 1, 2.

Figure 8:
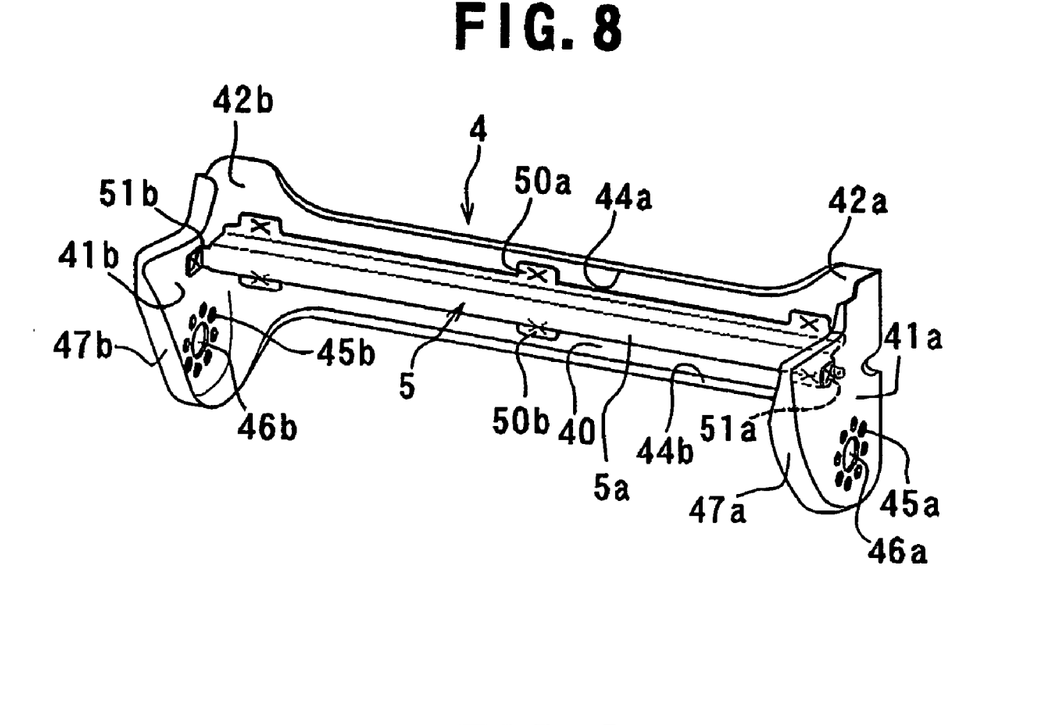
FIG. 8 is a schematic perspective view in which the lower member of FIG. 6 and the supplementary member of FIG. 6 are combined with each other.

As shown in FIG. 8, the supplementary member 5 is applied onto an inner surface of the longitudinal body 40 of the lower member 4 and is mounted to the lower member 4 by spot-welding the tongue-shaped pieces 50a, 50b of the supplementary member 5 to the longitudinal body 40 of the lower member 4, and spot-welding the tongue-shaped pieces 51a, 51b of the supplementary member 5 to the bracket portions 41a, 41b of the lower member 4.

The base section 3b of the upper member 3 is mounted to the side members 1, 2 by spot-welding both side regions of the rising portion 34b of the base section 3b to the second and fourth flange portions 12, 22 of the side members 1, 2, and spot-welding the tongue-like pieces 35a, 35b of the base section 3b to lower regions of the inward protruding surfaces of the rib portions 13, 23 of the side members 1, 2, whereby the upper section 3a is received and supported by the base section 3b. Incidentally, the mounting of the upper section 3a to the side members 1, 2 is preferably carried out after the base section 3b is mounted to the side members 1, 2.

As shown in FIG. 8, the supplementary member 5 is applied onto an inner surface of the longitudinal body 40 of the lower member 4 and is mounted to the lower member 4 by spot-welding the tongue-like pieces 50a, 50b of the supplementary member 5 to the longitudinal body 40 of the lower member 4, and spot-welding the tongue-like pieces 51a, 51b of the supplementary member 5 to the bracket portions 41a, 41b of the lower member 4.

Figure 9:
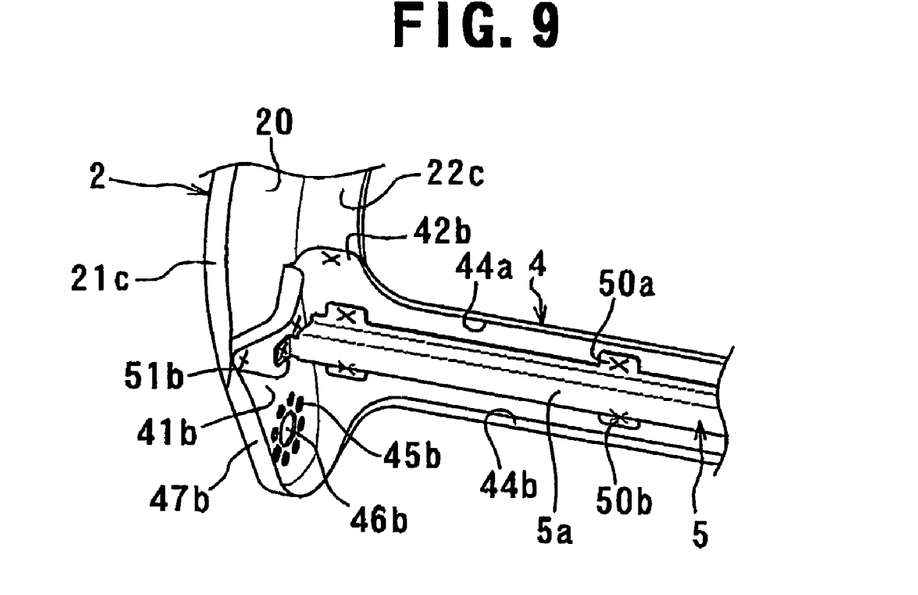
FIG. 9 is a schematic perspective view that is of assistance in explaining the connecting of the lower member to the side members.

As shown in FIG. 9, the lower member 4 to which the supplementary member 5 is mounted is combined with the side members 1, 2 with the bracket portions 41a, 41b (only one bracket portion 41b is shown in FIG. 9) and upward extending pieces 42a, 42b (only one upward extending pieces 42b is shown in FIG. 9) of the lower member 4 being engaged with the side members 1, 2 (only one side member 1 is shown in FIG. 9), and is mounted to the side members 1, 2 by spot-welding the upward extending pieces 42a, 42b of the lower member 4 to the lower regions 12c, 22c of the second and fourth flange sections 12, 22 of the side members 1, 2 (only one lower region 22c is shown in FIG. 9) and spot-welding the bracket portions 41a, 41b of the lower member 4 to lower regions of the main plate sections 10, 20 of the side members 1, 2 (only one main plate section 20 is shown in FIG. 9).

Figure 10:
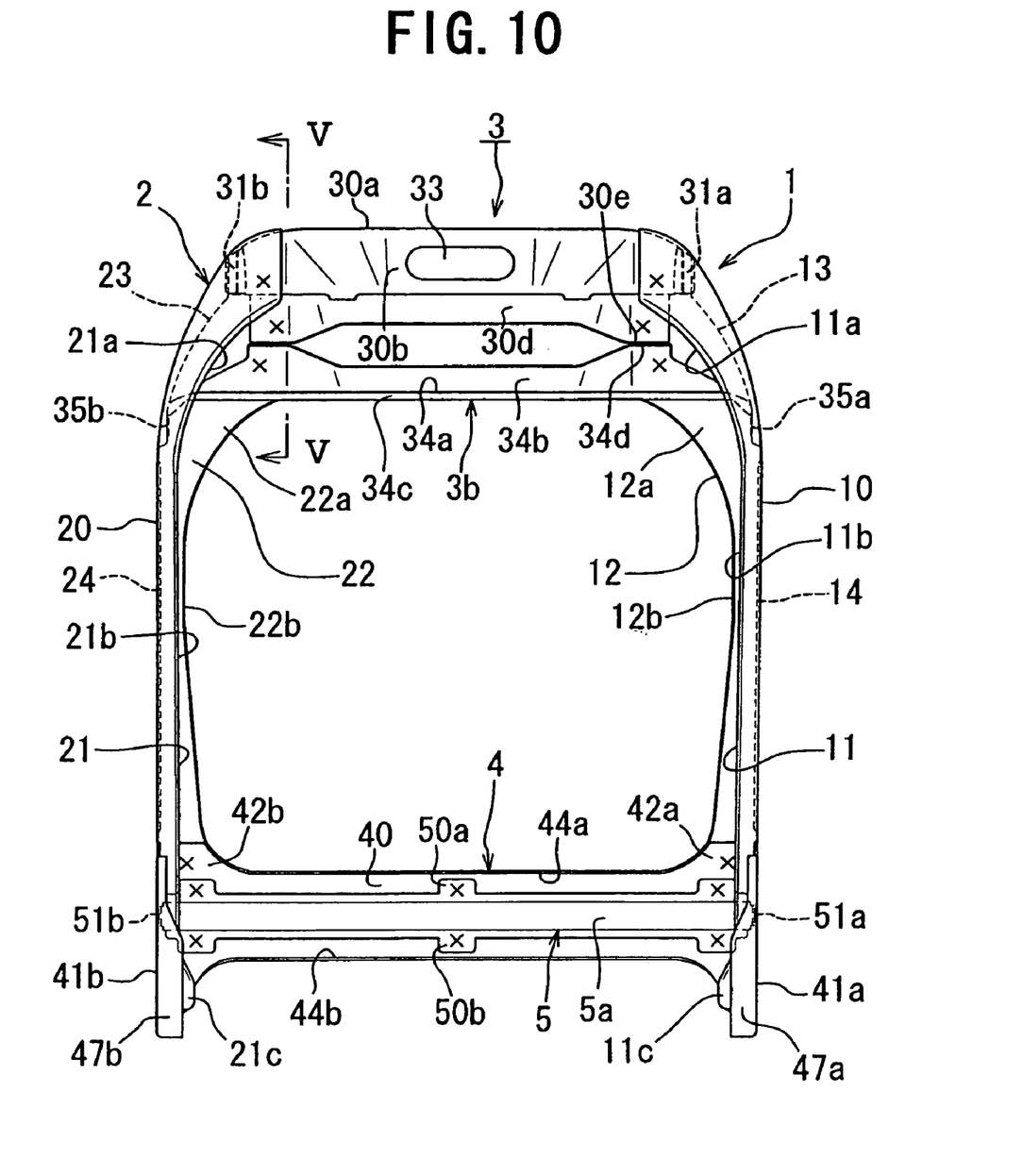
FIG. 10 is a schematic front view of an assembled seat back frame according to the embodiment of the present invention.
Figure 11:
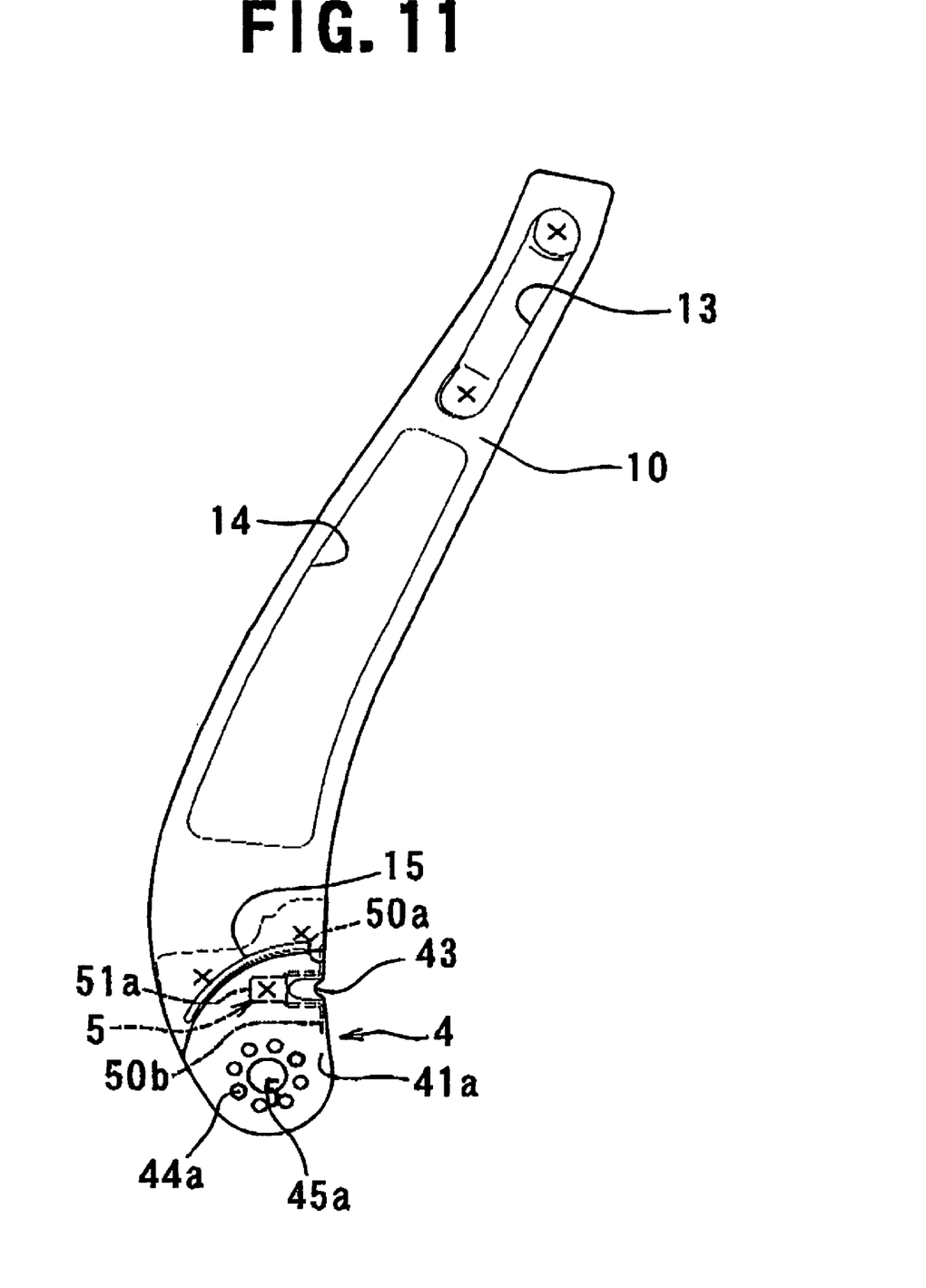
FIG. 11 is a schematic side view of the seat back frame shown in FIG. 10.

Referring to FIGS. 10 and 11, there is illustrated the seat back frame which is assembled as discussed above. The seat back frame is formed into a substantially quadrilateral-shape by spot-welding the upper member 3 including the upper section 3a and the base section 3b, and the lower member 4 including the supplementary member 5, to the side members 1, 2 at the several points.

The seat back frame is assembled from only the side members 1, 2, the upper member 3, and the lower member 4, so that the seat back frame can be made with a few parts. Each of the components of the seat back frame is made of a thin plate of ultra-high tensile strength steel as discussed above, so that the seat back frame is made lighter in weight. Further, each of the components of the seat back frame is formed into a predetermined shape by press-machining the thin plate of ultra-high tensile strength, whereby the components can be precisely shaped and sized. In addition, the both sides of the upper member 3 and the both sides of the lower member 4 are engaged with the substantially U-shaped side members 1, 2 and welded to the side members 1, 2, whereby the mechanical strength of the seat back frame is improved. Also, the connecting of the components is performed by spot-welding, so that it is possible to easily assemble the seat back frame while assuring a dimensional precision.

Figure 12:
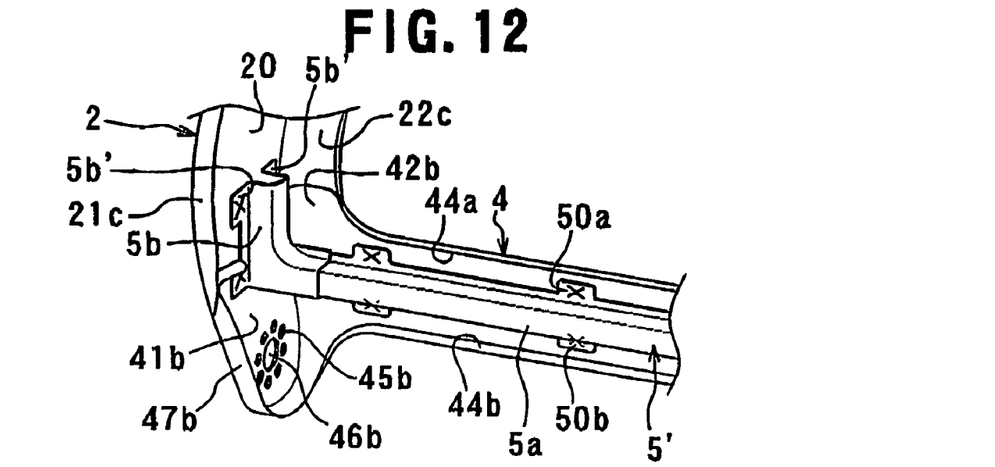
FIG. 12 is a schematic perspective view of a modification of the supplementary member shown in FIG. 6.

Referring to FIG. 12, there is illustrated a modification of the supplementary member 5. The supplementary member 5' of FIG. 12 is substantially similar to the supplementary member 5 of FIGS. 1, 2, 6, 8, 9, 10 and 11 except that bracket portions 5b (only one bracket portion 5b is shown in FIG. 12) are provided at both end portions of the longitudinal body 5a of the supplementary member 5' in lieu of the tongue-shaped pieces 51a, 51b. Each of the bracket sections 5b is formed into a substantially L-shape as viewed from the front side, and has the shape of Ohm symbol in cross-section. The bracket portions 5b are attached to the side members 1, 2 (only one side member 2 is shown in FIG. 12) by spot-welding fin portions 5b' of the bracket portions 5b to the main plate sections 10, 20 of the side members 1, 2 (only one main plate section 20 is shown in FIG. 12). The bracket portions 5b extend between the longitudinal body 5a of the supplementary member 5' on the lower member 4 and the side members 1, 2, so that the side members 1, 2 and the lower member 4 are reinforced by the bracket portions 5b. Incidentally, the supplementary member 5' may be made as a one-piece member comprising the longitudinal body 5a and the bracket portions 5b, or may comprise the longitudinal body 5a and bracket portions 5b which are made separately from one another.

Figure 13:
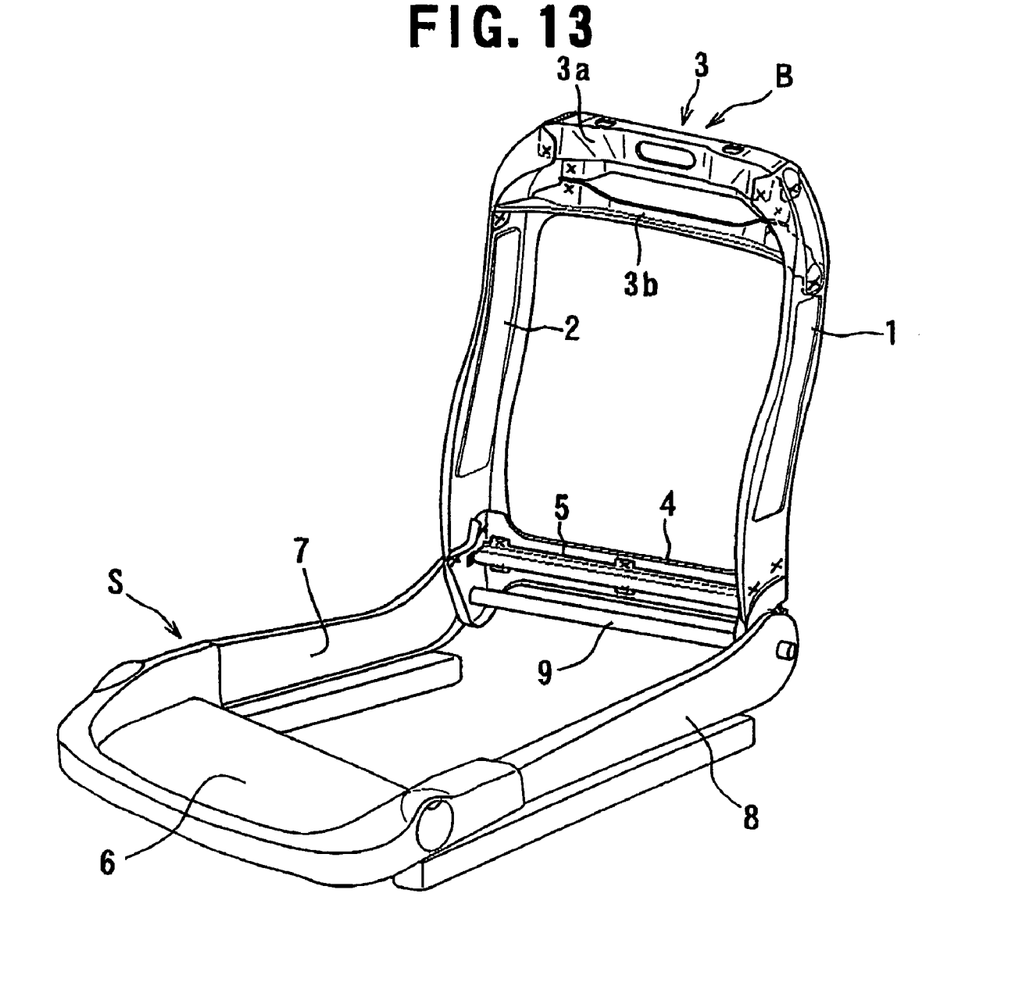
FIG. 13 is a schematic perspective view of a vehicle seat including the seat back frame of FIG. 10.

Referring to FIG. 13, the vehicle seat in which the seat back frame B constructed as discussed above is employed will be discussed hereinafter. A seat cushion frame S of the vehicle seat comprises a pair of spaced apart base sections 7, 8 and a pan frame section 6 welded to forward end portions of the base sections 7, 8. Each of the base sections 7, 8 and pan frame section 6 is made of a thin plate of ultra-high tensile strength steel. Recliner devices (not shown) are provided between lower regions of side portions of the seat back frame B and rearward regions of the base sections 7, 8 of the seat cushion frame S. The unshown recliner devices are connected to each other through a connecting shaft 9.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A seat back frame for a vehicle seat comprising: first and second side members spaced apart from each other; each of said first and second side members being made of ultra-high tensile strength steel; said first side member having a first longitudinal body of a substantially U-shape in cross-section; said first longitudinal body comprising a pair of first spaced apart flange sections and a first main plate section interconnecting said first spaced apart flange sections; said first side member having a first upper region, a first lower region, and a middle region between said first upper region and said first lower region; said second side member having a second longitudinal body of a substantially U-shape in cross-section; said second longitudinal body comprising a pair of second spaced apart flange sections and a second main plate section interconnecting said second spaced apart flange sections; said second side member having a second upper region, a second lower region, and a second middle region between said second upper region and said second lower region; an upper member arranged between said first and second upper regions of said first and second side members; said upper member being made of ultra-high tensile strength steel; said upper member having first and second end portions; said upper member being mounted, by spot-welding, to said first and second upper regions of said first and second side members with said first and second end portions thereof being fitted in said first and second side members; and a lower member arranged between said first and second lower regions of said first and second side members; said lower member being made of ultra-high tensile strength steel; said lower member having third and fourth end portions; and said lower member being mounted, by spot-welding, to said first and second lower regions of said first and second side members with said third and fourth end portions thereof being fitted in said first and second side members.

2. A seat back frame according to claim 1 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

3. A seat back frame according to claim 2, further including a supplementary member having the shape of a substantially Ohm-symbol in cross-section, said supplementary member being spot-welded to said longitudinal body and bracket portions of said lower member, whereby said lower member is reinforced.

4. A seat back frame according to claim 2, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

5. A seat back frame according to claim 1 wherein said upper member comprises an upper section and a base section, said upper section and said base section being combined with each other.

6. A seat back frame according to claim 5 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

7. A seat back frame according to claim 6, further including a supplementary member having the shape of a substantially Ohm-symbol in cross-section, said supplementary member being spot-welded to said longitudinal body and bracket portions of said lower member, whereby said lower member is reinforced.

8. A seat back frame according to claim 6, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

9. A seat back frame according to claim 8 wherein said first side member is provided at an upper area of said first main plate section thereof with a first reinforcing rib portion, said first reinforcing rib portion being formed by embossing a region of said upper area of said first main plate section and making the region of said upper area of said first main plate section concave in such a manner that the region of said upper area of said first main plate section protrudes inward, wherein said second side member is provided at an upper area of said second main plate section thereof with a second reinforcing rib portion, said second reinforcing rib portion being formed by embossing a region of said upper area of said second main plate section and making the region of said upper area of said second main plate section concave in such a manner that the region of said upper area of said second main plate section protrudes inward, wherein said upper section of said upper member has fifth and sixth end portions, and first and second tongue-shaped pieces provided at said fifth and sixth end portions of said upper section, said first and second tongue-shaped pieces being spot-welded to inward protruding surfaces of said first and second reinforcing rib portions, and wherein said base section of said upper member has seventh and eighth end portions, and third and fourth tongue-shaped pieces provided at said seventh and eighth end portions of said base section, said third and fourth tongue-shaped pieces being spot-welded to said inward protruding surfaces of said first and second reinforcing rib portions.

10. A seat back frame according to claim 9 wherein said inward protruding surfaces of said first and second reinforcing rib portions are made flat.

11. A seat back frame according to claim 10 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

12. A seat back frame according to claim 11, further including a supplementary member having the shape of a substantially Ohm-symbol in cross-section, said supplementary member being spot-welded to said longitudinal body and bracket portions of said lower member, whereby said lower member is reinforced.

13. A seat back frame according to claim 11, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

14. A seat back frame according to claim 9 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

15. A seat back frame according to claim 14, further including a supplementary member having the shape of a substantially Ohm-symbol in cross-section, said supplementary member being spot-welded to said longitudinal body and bracket portions of said lower member, whereby said lower member is reinforced.

16. A seat back frame according to claim 14, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

17. A seat back frame according to claim 9, wherein each of said first and second reinforcing rib portions is formed into a substantially rectangular shape.

18. A seat back frame according to claim 17 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

19. A seat back frame according to claim 18, further including a supplementary member having the shape of a substantially Ohm-symbol in cross-section, said supplementary member being spot-welded to said longitudinal body and bracket portions of said lower member, whereby said lower member is reinforced.

20. A seat back frame according to claim 18, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

21. A seat back frame according to claim 1 wherein said first side member is provided at an upper area of said first main plate section thereof with a first reinforcing rib portion, said first reinforcing rib portion being formed by embossing a region of said upper area of said first main plate section and making the region of said upper area of said first main plate section concave in such a manner that the region of said upper area of said first main plate section protrudes inward, wherein said second side member is provided at an upper area of said second main plate section thereof with a second reinforcing rib portion, said second reinforcing rib portion being formed by embossing a region of said upper area of said second main plate section and making the region of said upper area of said second main plate section concave in such a manner that the region of said upper area of said second main plate section protrudes inward, and wherein said upper member is provided at said first and second end portions thereof with first and second tongue-shaped pieces, said first and second tongue-shaped pieces being spot-welded to inward protruding surfaces of said first and second reinforcing rib portions.

22. A seat back frame according to claim 21 wherein said first side member is provided at a middle area of said first main plate section thereof with a third reinforcing rib portion and provided at a lower area of said first main plate section thereof with a fourth reinforcing rib portion, and wherein said second side member is provided at a middle area of said second main plate section thereof with a fifth reinforcing rib portion and provided at a lower area of said second main plate section thereof with a sixth reinforcing rib portion.

23. A seat back frame according to claim 22 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

24. A seat back frame according to claim 23, further including a supplementary member having the shape of a substantially Ohm-symbol in cross-section, said supplementary member being spot-welded to said longitudinal body and bracket portions of said lower member, whereby said lower member is reinforced.

25. A seat back frame according to claim 23, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

26. A seat back frame according to claim 21 wherein one of said first spaced apart flange sections of said first longitudinal body is provided with seventh reinforcing ribs, and wherein one of said second spaced apart flange sections of said second longitudinal body is provided with eighth reinforcing ribs.

27. A seat back frame according to claim 26 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

28. A seat back frame according to claim 27, further including a supplementary member having the shape of a substantially Ohm-symbol in cross-section, said supplementary member being spot-welded to said longitudinal body and bracket portions of said lower member, whereby said lower member is reinforced.

29. A seat back frame according to claim 27, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

30. A seat back frame according to claim 21 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

31. A seat back frame according to claim 30, further including a supplementary member having the shape of a substantially Ohm-symbol in cross-section, said supplementary member being spot-welded to said longitudinal body and bracket portions of said lower member, whereby said lower member is reinforced.

32. A seat frame according to claim 30, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fifth fourth bracket portions being spot-welded to said first and second bracket portions of said lower member.

33. A seat back frame according to claim 21 wherein said inward protruding surfaces of said first and second reinforcing rib portions are made flat.

34. A seat back frame according to claim 33 wherein said first side member is provided at a middle area of said first main plate section thereof with a third reinforcing rib portion and provided at a lower area of said first main plate section thereof with a fourth reinforcing rib portion, and wherein said second side member is provided at a middle area of said second main plate section thereof with a fifth reinforcing rib portion and provided at a lower area of said second main plate section thereof with a sixth reinforcing rib portion.

35. A seat back frame according to claim 34 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

36. A seat back frame according to claim 35, further including a supplementary member having the shape of a substantially Ohm-symbol in cross-section, said supplementary member being spot-welded to said longitudinal body and bracket portions of said lower member, whereby said lower member is reinforced.

37. A seat back frame according to claim 35, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

38. A seat back frame according to claim 33 wherein one of said first spaced apart flange sections of said first longitudinal body is provided with seventh reinforcing ribs, and wherein one of said second spaced apart flange sections of said second longitudinal body is provided with eighth reinforcing ribs.

39. A seat back frame according to claim 38 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

40. A seat back frame according to claim 39, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

41. A seat back frame according to claim 39, further including a supplementary member having the shape of a substantially Ohm-symbol in cross-section, said supplementary member being spot-welded to said longitudinal body and bracket portions of said lower member, whereby said lower member is reinforced.

42. A seat back frame according to claim 33 wherein said lower member comprises a longitudinal body having ninth and tenth end portions, and first and second bracket portions provided at said ninth and tenth end portions, said first and second bracket portions of said lower member being spot-welded to said first and second lower regions of said first and second side members.

43. A seat back frame according to claim 42, further including a supplementary member having the shape of a substantially Ohm-symbol in cross-section, said supplementary member being spot-welded to said longitudinal body and bracket portions of said lower member, whereby said lower member is reinforced.

44. A seat back frame according to claim 42, further including a supplementary member for reinforcing said lower member, said supplementary member comprising a substantially longitudinal body, said substantially longitudinal body of said supplementary member having eleventh and twelfth end portions, and third and fourth substantially L-shaped bracket portions provided at said eleventh and twelfth end portions, said supplementary member being spot-welded to said longitudinal body of said lower member, and said third and fourth bracket portions being spot-welded to said first and second bracket portions of said lower member.

* * * * *